United States Patent
Bazzo et al.

(10) Patent No.: US 7,700,026 B2
(45) Date of Patent: Apr. 20, 2010

(54) PROCESS AND APPARATUS FOR THE PRODUCTION OF ARTICLES MADE OF PLASTIC MATERIAL WITH AT LEAST ONE OVERMOULDED COMPONENT

(75) Inventors: Maurizio Bazzo, Oderzo (IT); Peter Dal Bo, Vittorio Veneto (IT)

(73) Assignee: Inglass S.r.l., San Polo Di Piave (Treviso) (IT)

( * ) Notice: Subject to any disclaimer, the term of this patent is extended or adjusted under 35 U.S.C. 154(b) by 691 days.

(21) Appl. No.: 11/490,748

(22) Filed: Jul. 20, 2006

(65) Prior Publication Data
US 2007/0018352 A1    Jan. 25, 2007

(30) Foreign Application Priority Data
Jul. 22, 2005    (IT) .................... TO2005A0506

(51) Int. Cl.
*B29C 45/16* (2006.01)
*B29C 45/26* (2006.01)
*B29C 45/56* (2006.01)

(52) U.S. Cl. .............. 264/252; 264/255; 425/112; 425/125; 425/127

(58) Field of Classification Search .............. 425/112, 425/127, 125; 264/252, 255
See application file for complete search history.

(56) References Cited

U.S. PATENT DOCUMENTS

| 5,344,296 | A  | * | 9/1994 | Laninga ................. 425/121 |
| 6,627,137 | B2 | * | 9/2003 | Saito et al. ............. 264/275 |
| 6,899,363 | B2 | * | 5/2005 | Dry ..................... 296/1.09 |

FOREIGN PATENT DOCUMENTS

| DE | A10217584 |   | 11/2002 |
| JP | 08288326  | * | 11/1996 |

* cited by examiner

*Primary Examiner*—Joseph S Del Sole
*Assistant Examiner*—Lorraine Rios
(74) *Attorney, Agent, or Firm*—Heslin Rothenberg Farley & Mesiti P.C.; Victor A. Cardona

(57) ABSTRACT

Described herein is a process and apparatus for the production of an article made of moulded plastic material with a first component and at least one second component overmoulded on the first component, in which, in the second injection step for overmoulding the second component, the moulding cavity is at least in part delimited by at least one resting surface that is independent of and mobile with respect to the mobile surface of mould and is set in contact with the first component.

27 Claims, 5 Drawing Sheets

US 7,700,026 B2

PROCESS AND APPARATUS FOR THE PRODUCTION OF ARTICLES MADE OF PLASTIC MATERIAL WITH AT LEAST ONE OVERMOULDED COMPONENT

CROSS REFERENCE TO RELATED APPLICATIONS

This application is a claims priority from Italian Patent Application No. TO2005A000506 filed on Jul. 22, 2005, the entire disclosure of which is incorporated herein by reference.

FIELD OF THE INVENTION

The present invention relates to the production of articles made of moulded plastic material in general, particularly (but not exclusively) plates, with at least one overmoulded component.

The plates to which the invention finds particular (but, as has been said, not exclusive) application may be transparent or not, and also the elements overmoulded thereon may be transparent or not, made of the same material as the plates or of a different material. Such elements may be overmoulded in peripheral areas of the plate, for example along its peripheral edge, or else in different areas.

In any case, the invention is particularly aimed at the production of articles with aesthetic characteristics of high quality, for which the surface in view is conventionally referred to as "class A".

STATE OF THE PRIOR ART

Traditional overmoulding techniques envisage traditionally a first injection step to form a first component and a subsequent second step of injection of the second component for overmoulding thereof on the first component, in which said first and second injection steps are carried out within a moulding cavity defined between a stationary surface of mould and a surface of mould that is mobile with respect to the stationary surface of mould and can be displaced against the latter under the action of a closing pressure. One or both of the parts of injection can be combined with a step of compression, or else a step of expansion-compression, of the material injected in the moulding cavity. This technique enables articles with aesthetic characteristics of high quality and also with relatively large dimensions to be obtained, such as for example plates for producing transparent panels in the automotive sector. In this case, the methodology currently used envisages the first injection step of injection and possible compression (or expansion-compression) in a first station. The moulding cavity is then opened, and the first component is transferred (generally via rotation about a vertical axis or else a horizontal axis) to a second station, where a second mobile surface of mould delimits a new cavity for injection (said injection being possibly also combined with a step of compression or expansion-compression) of the material for overmoulding the second component on the first. A typical example of a moulding apparatus of this type is represented by presses of the "stack-mould" type with double counter-mould rotating about a vertical axis, as generally described in the document No. DE-A10217584.

Traditional techniques of overmoulding articles of not particularly high quality, or in any case of less noble aesthetic characteristics, envisage that the two injection steps will be carried out in a single station by varying the geometry of the moulding cavity between the first and the second injection steps by means of internal movements.

In an Italian patent application filed in the name of the present applicant on the same date as that of filing of the present application, the first and second steps of injection (and possible compression or expansion-compression) are envisaged also in a single station, by varying the moulding cavity geometrically, for example via a partial recession of the mobile surface of mould with respect to the stationary surface of mould.

In all of the cases described above, closing of the moulding cavity for carrying out the second injection step involves an at least partial contact between the mobile surface of mould, typically made of steel, and at least one corresponding surface area of the first component of plastic material moulded in the first step. Taking into account the extremely high closing pressures applied to the mobile surface of mould, the areas in contact therewith of the first component are subject to risks of damage, or at the very least of generation of imperfections or even just impressions, which, in the case of transparent articles, may be optically evident and hence unacceptable.

The above drawback is further accentuated in the case where overmoulding of the second component is obtained with techniques of injection-compression, or else of injection-expansion-compression, which, albeit enabling production of pieces of considerable dimensions, render even more critical the problems deriving from closing of the mobile surface of mould against the surface of the first component previously moulded. In an endeavour to reduce these problems, traditionally the approach has been to adjust the geometrical tolerances of the mobile surface of mould and of the first component that are to set themselves against one another during the second injection step. However, in the case of items of considerable dimensions, and hence with marked shrinkage of the first component following upon cooling thereof, said solutions prove particularly complex and such in any case as not to guarantee a constancy of results.

Added then to the problem connected to the shrinkage of the first component is the even more critical one deriving from possible deformations and or localized elastic yielding of the parts that make up the moulding apparatus (mould and corresponding press), particularly during application of extremely high pressures of closing of the mould in the case of injection-compression. Said deformations can give rise to variations of thickness of the first component moulded in the first step, which, for example in the case of articles such as a transparent plate of large size with a non-transparent peripheral frame overmoulded thereon, can give rise to unacceptable optical defects along the area of transition between the plate and the frame.

SUMMARY OF THE INVENTION

The purpose of the invention is to provide an effective solution to the technical problem presented above, avoiding having to adapt the geometrical tolerances of the mobile surface of mould and of the first component, which are to be set against one another during the second injection step, but intervening instead with controlled forces that minimize the stresses on the surface of the first component during the step of overmoulding of the second component, guaranteeing, however, a perfect closing of the moulding cavity.

According to the invention, this purpose is achieved by means of a process for the production of an article made of moulded plastic material with a first component and at least one second component overmoulded on the first component, as defined in the preamble of claim 1, basically characterized in that, in the second injection step for overmoulding the second component, the moulding cavity is at least in part delimited by at least one resting surface that is independent and mobile with respect to the mobile surface of mould and in contact with the first component.

Advantageously, the resting surface bears upon the first component with a generally uniform force of an amount lower than that of the closing pressure between the mobile and stationary surfaces of the mould.

Said force is conveniently controlled, may also be adjustable, or else may consist in an elastic load.

Furthermore, the aforesaid resting surface is conveniently floating, and even more conveniently can be defined by a plurality of contiguous floating mobile elements.

In regard to the complexity of the surface of the first component, the tolerances that can be achieved with operations of machining of the mobile surface of mould, the moulding techniques, the dimensions of the first component itself, and the corresponding shrinkage due to cooling, as well as on the basis of the possibility of adjustment provided by the moulding cycle, it is possible to identify, in the context of the present invention, different solutions that guarantee reduced stresses on the surface of the first component, with an optimal closing of the moulding cavity.

The process according to the invention is advantageously applicable to any overmoulding technique, whether by means of simple injection, or via injection-compression or else injection-expansion-compression, with rotation or displacement of the first component from a first station to a second station for overmoulding the second component, or else in a single station, with geometrical variation of the moulding cavity by means of internal movements or various innovative techniques, such as the one forming the subject of the already cited Italian patent application filed on the same date by the present applicant.

The subject of the invention is also an apparatus for implementation of the process defined above, of the type comprising a stationary surface of mould and a surface of mould that is mobile with respect to the stationary surface of mould and can be displaced against the latter under the action of a closing pressure to define a moulding cavity for carrying out a first step of injection of the first component and a subsequent second step of injection of the second component for overmoulding thereof on the first component, said apparatus being basically characterized in that it comprises at least one resting surface that is independent and mobile with respect to the mobile surface of mould to delimit, in said second injection step, the moulding cavity, and contrast means for setting said resting surface in contact with the first component.

BRIEF DESCRIPTION OF THE DRAWINGS

The invention will now be described in detail with reference to the annexed plate of drawings, which are provided purely by way of non-limiting example and in which.

DETAILED DESCRIPTION OF EMBODIMENTS OF THE INVENTION

The process and apparatus according to the invention apply, as has been said, to the production of articles made of moulded plastic material with a first component and at least one second component overmoulded on the first, and more particularly (even though not exclusively) in the case where the first component is transparent or in any case with a surface that, in use, is exposed to view, presenting aesthetic characteristics of high quality. The plate of drawings refers in particular to the production of an article consisting in a roof for use in the automotive sector, the first component of which, designated by 1, consists of a transparent plate (typically made of polycarbonate) of large dimensions, on the dorsal face of which is moulded a perimetral frame constituting the second overmoulded component 2. Said perimetral frame is normally not transparent, typically black, and can be formed with fixing appendages and with possible stiffening projections or ribbings (not illustrated).

Figure 1A:
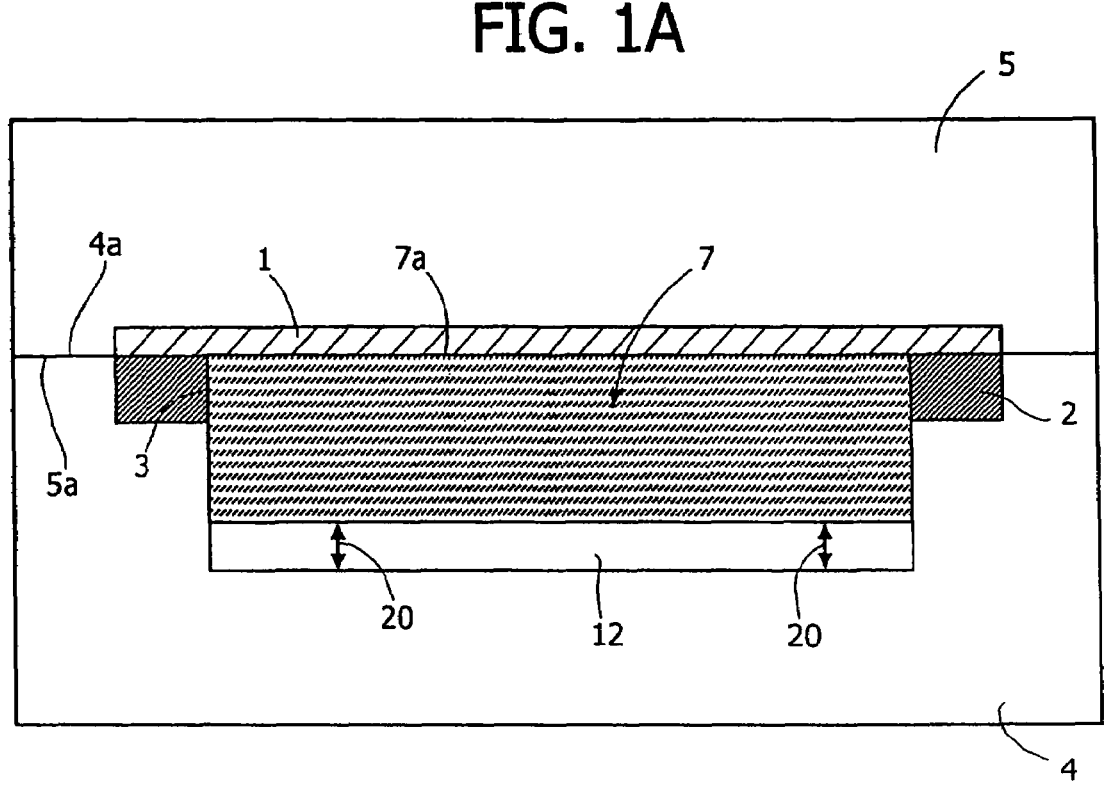
FIG. 1A is a cross-sectional schematic view that provides an illustration of a part of a moulding apparatus according to the invention in the step of forming of a second component overmoulded on a first component previously formed.

FIG. 1A is a schematic illustration of a possible embodiment of the apparatus for producing an article of this sort. The more general inventive idea underlying the invention is that of overmoulding the second component 2 by applying to the first component 1 previously moulded a pressure, necessary for closing the overmoulding cavity, which is uniform, controlled and lower than the pressure for closing the mould.

In FIG. 1A, the overmoulding cavity is designated by 3, whilst the references 4 and 5 designate, respectively, a mould and a countermould, which are translatable with respect to one another. In the case of the example illustrated, the mould 4 can be brought up to, and moved away from, the countermould 5, which is instead stationary during movement of the mould 4.

It is to be noted that the mould 4 and the countermould 5 can identify a single station, in the case where moulding of the first and second components 1, 2 envisages just the injection of the respective plastic materials, and possibly also in the case where one or both of the injection steps are combined with a step of compression or of expansion-compression, as in the case of the already cited co-pending Italian patent application filed in the name of the present applicant. Alternatively, the mould 4 and the countermould 5 can identify a second station, in which the first component 1, previously moulded in a first station, is transferred, for example by means of rotation of the countermould 5 about a vertical axis or else a horizontal axis.

The step of moulding of the first component 1 will not be described in detail in so far as it is irrelevant to the purposes of the present invention: by way of indicative example, it may be carried out, for example, via injection-compression with modalities corresponding in all or in part to the ones described and illustrated in the prior Italian patent applications Nos. TO2004A000696, TO2004A000697, TO2004A000698, TO2004A000699, TO2004A000700, TO2004A000701, TO2004A000702, TO2004A000703, TO2004A000716 and TO2004A000813, not published at the date of filing of the present application.

FIG. 1A illustrates the subsequent step of overmoulding of the second component 2 on the first component 1, within the cavity 3. Normally, said cavity 3 is delimited between the mutually facing surfaces of the mould 4 and of the countermould 5, designated, respectively, by 4a and 5a, which are closed against one another under the action of a closing pressure exerted by the press of the moulding apparatus, and by the surface area of the first component 1 on which the second component 2 is to be overmoulded. At the end of the possible compression step (or else during injection in the case where compression is not envisaged), the surfaces 4a and 5a are pressed into contact against one another by the action of the aforesaid closing pressure.

According to the invention, the overmoulding cavity 3 is delimited without any direct contact between the surface 4a of the mould 4 and the surface facing it of the first component 1. In the embodiment represented in FIG. 1A, the contact is obtained by an element 7 inserted in a recess 12 of the mould 4, the face of which facing the first component 1 defines a surface 7a, independent of the surface 4a and mobile with respect thereto, resting against the first component 1. Said surface 7a is kept in contact with the first component 1 with a controlled and uniform force of an amount lower than that of closing between the surfaces 4a and 5a.

In the case of FIG. 1A, this force consists of an elastic thrust applied, to the surface of the mobile element 7 opposite to the surface 7a, by springs (represented by the arrows 20), set between the bottom of the recess 12 and the surface of the element 7 opposite to the one facing the first component 1. In this way, said element 7 is in practice floating, in such a way as to close the surface 7a uniformly against the first component 1 even if this presents variations of thickness following upon moulding thereof. The loading of the springs 20 will be chosen appropriately in such a way that the surface 7a is pressed against the component 1 with the minimum pressure sufficient to obtain closing. Said pressure will in any case be less than that of closing between the surfaces 4a and 5a, and in this way risks of producing optical defects on the first component 1—particularly in the areas adjacent to the cavity 3, where the second component 2 is subsequently moulded—will be prevented.

It should be noted that the elastic thrust of the surface 7a against the first component 1 could be generated, instead of by springs, by the intrinsic elasticity of the element 7, which in this case will be made of a relatively elastically compliant material, for example Teflon™, and will be set resting against the bottom of the recess 12.

Figure 1B:
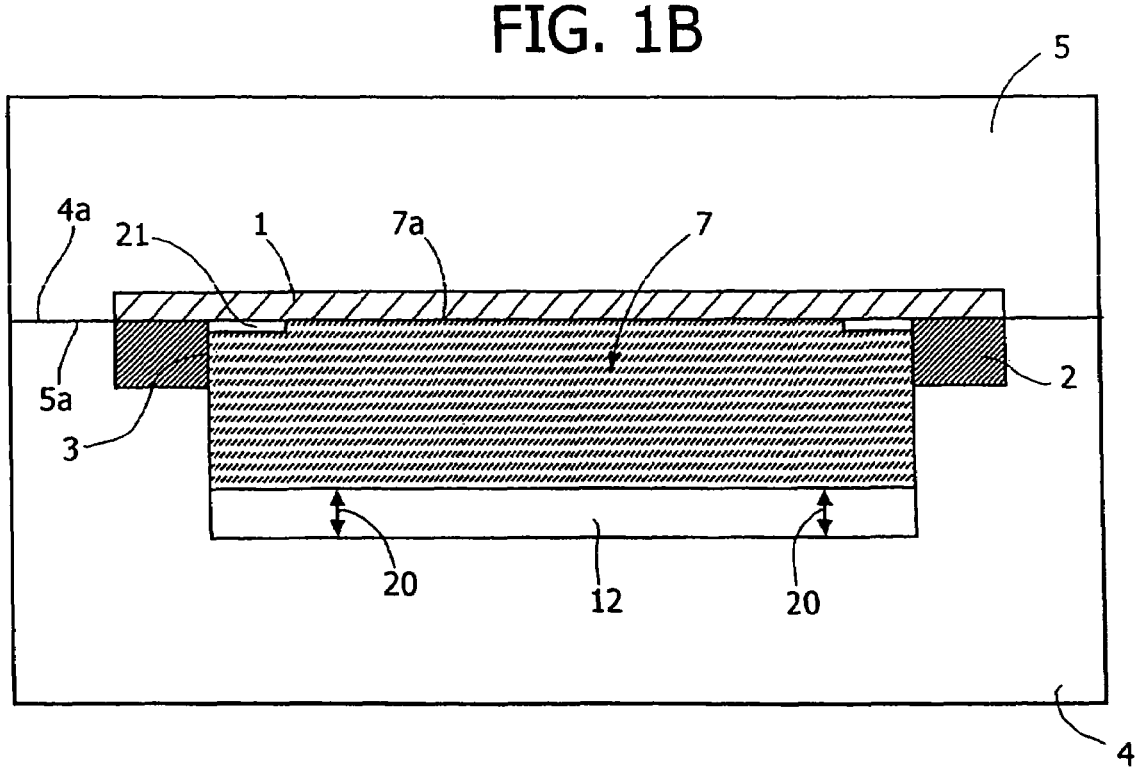
FIG. 1B is a view similar to that of FIG. 1 of a variant of the apparatus.

In the case of FIG. 1A, the surface 7a covers the entire extension of the first component 1 up to the cavity 3. Alternatively, and as is illustrated in FIG. 1B, the surface 7a could present a perimetral depression so as to delimit a gap of pre-defined amount along the peripheral area of the first component 1 adjacent to the cavity 3.

Furthermore, the mobile element 7 could be formed, instead of by a single body, by a plurality of independent bodies, as will be further clarified in what follows.

Figure 2:
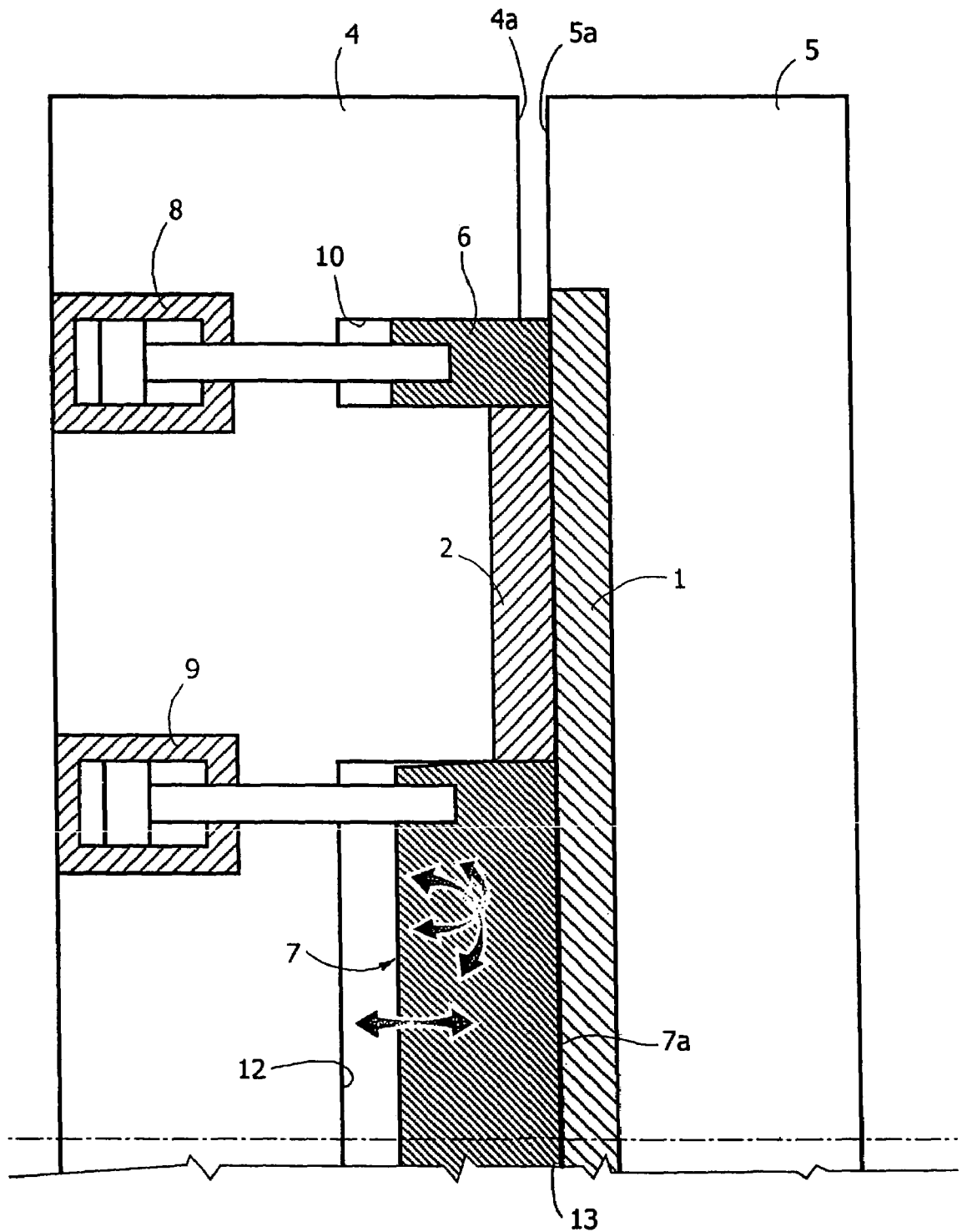
FIG. 2 is a view generally similar to that of FIG. 1, but only partial, of a variant of the apparatus.

In the case of the variant of FIG. 2, in which parts that are identical or similar to the ones described previously are designated by the same reference numbers, the mobile element 7 is also floating, in the sense that it is set with allowance within the recess 12 of the mould 4 in a substantially freely oscillating, or inclinable, way to adapt to possible variations of thickness of the first component 1 previously moulded. Said variations of thickness can, for example, arise in the case where forming of the first component 1 is carried out via injection-compression.

The surfaces 4a and 5a are represented in a condition slightly set at a distance from one another corresponding to the stroke for opening of the mould 4 with respect to the countermould 5 for carrying out the possible compression operation combined with injection of the material of the second component 2.

In this case, the external perimeter of the cavity 3, which also in this example is annular, is delimited by one or more mobile elements 6 guided in a slidable way within corresponding recesses 10 of the mould 4, which set themselves in contact with the surface of the first component 1, on which the second component 2 will be overmoulded, under the action of a pressure applied controlled normally by linear actuators 8. Similar linear actuators 9, which may be hydraulic, pneumatic, electromechanical or of any other type, keep the mobile element 7, and hence the surface 7a, in contact with the first component 1. The thrust exerted by them will be adjustable and can be graduated according to the requirements of the moulding cycle.

Figure 3:
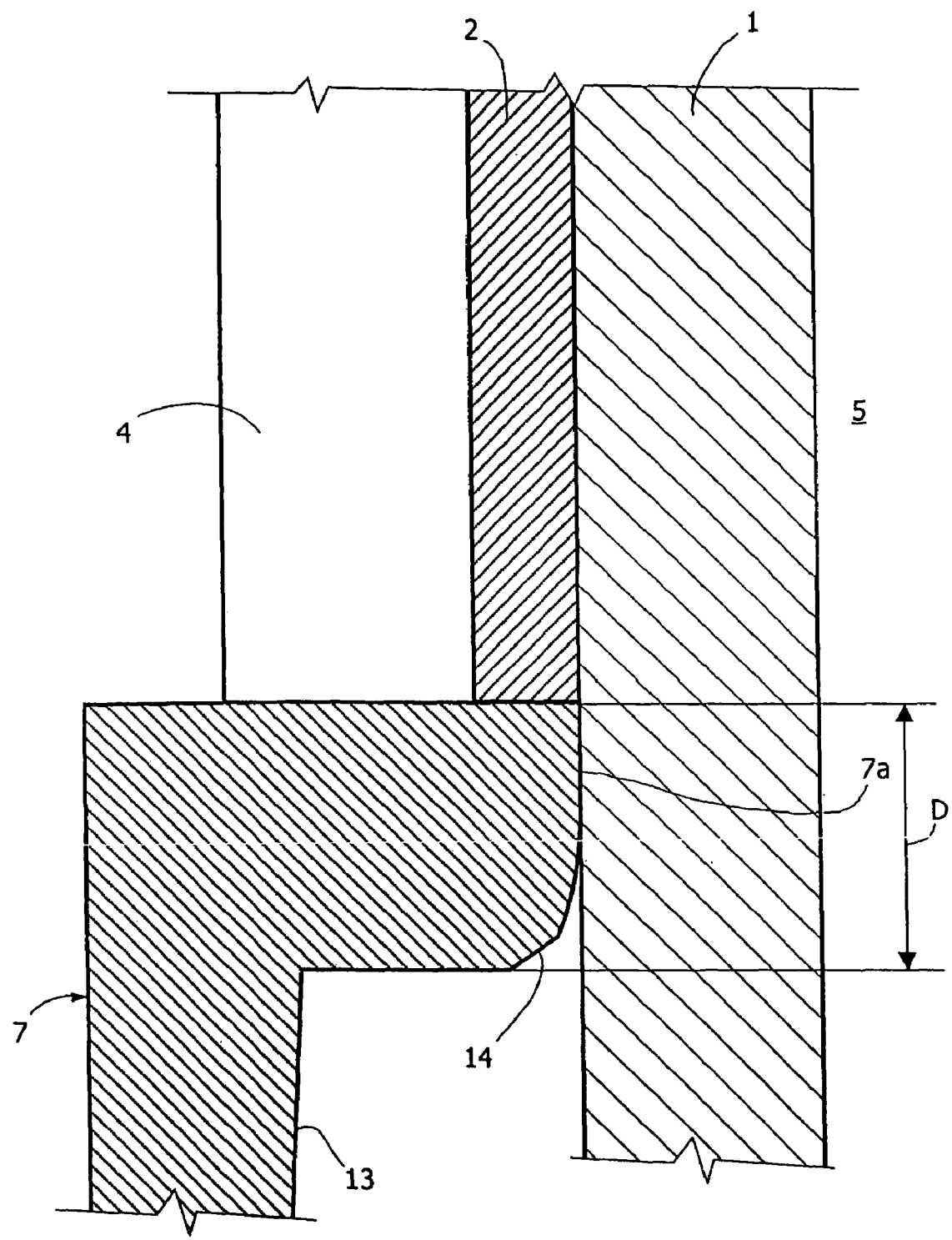
FIG. 3 is a view at an enlarged scale illustrating a detail of another variant of the apparatus.

As is illustrated in the variant of FIG. 3, the mobile element 7 could be formed with a recess or internal undercut 13 in such a way as to limit its area of contact against the surface of the first component 1 facing it. In said variant, the mobile element 7 is formed, between its part in contact with the surface of the first component 1 and the recess 13, with a radiusing of gradual transition 14, which enables prevention of the formation, on the surface of the first component 1, of a line of clear division between the area of contact and that of non-contact with the mobile element 7. The dimension, designated by D in the figures, of the area of contact between the mobile element 7 and the surface of the first component 1 should be as little as possible to limit any alterations of said surface that may be visible from outside.

Figure 4:
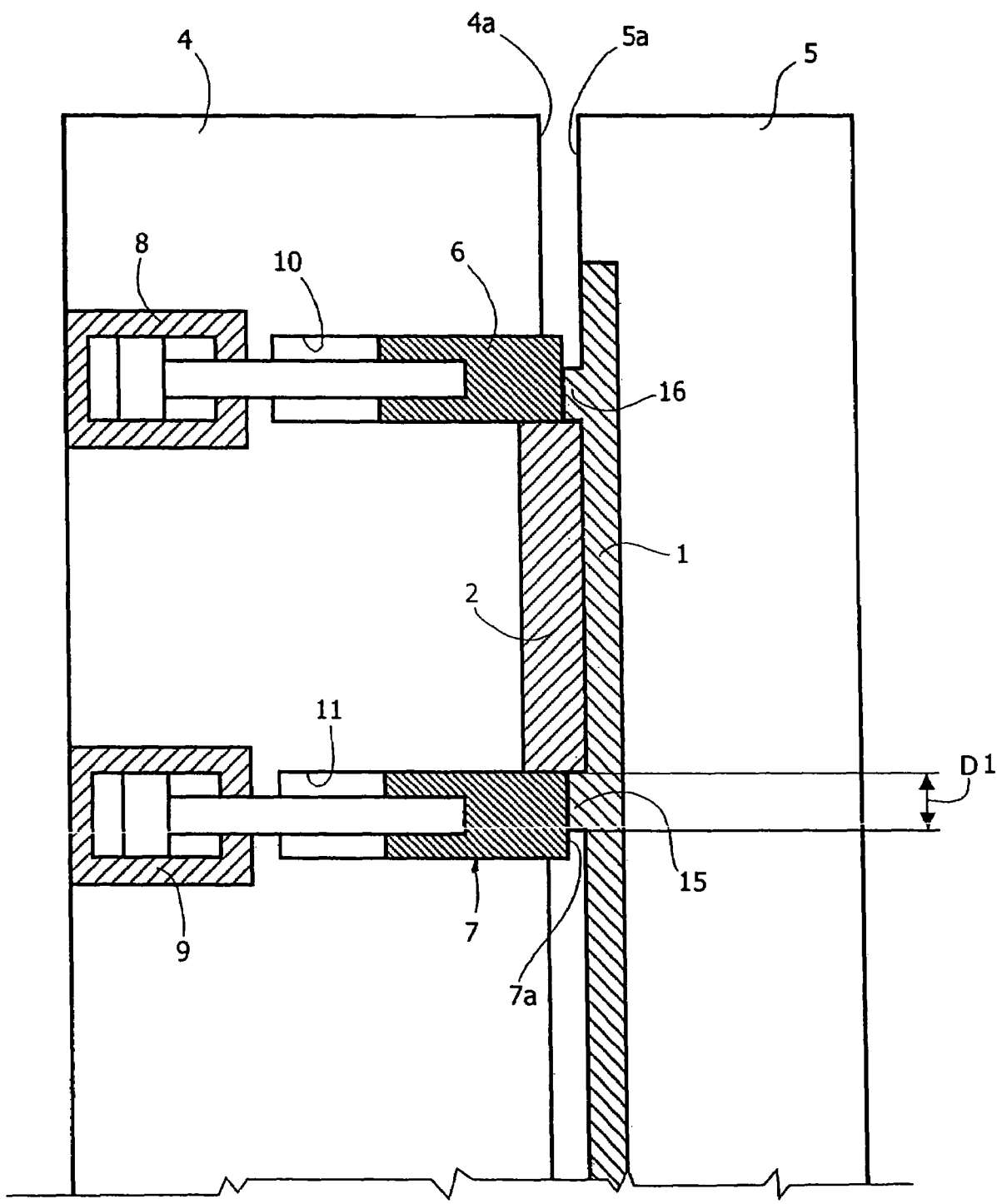
FIG. 4 is a view similar to that of FIG. 2 illustrating a further embodiment of the apparatus.

To reduce said dimension further, for example to the value D1 indicated in the variant of FIG. 4, the mobile element 7, and also the mobile element or mobile elements 6, may conveniently rest against respective projections or annular edges in relief 15, 16, previously formed on the surface of the first component 1 during moulding thereof. With said solution, which provides a certain effect of aesthetic "masking" of the areas of contact with the mobile elements 6 and 7, the stresses generated on the first component 1 during overmoulding of the second component 2 may also be reduced, thus safeguarding the overall optical quality of said component 1 particularly in the case where it is transparent.

Figure 5:
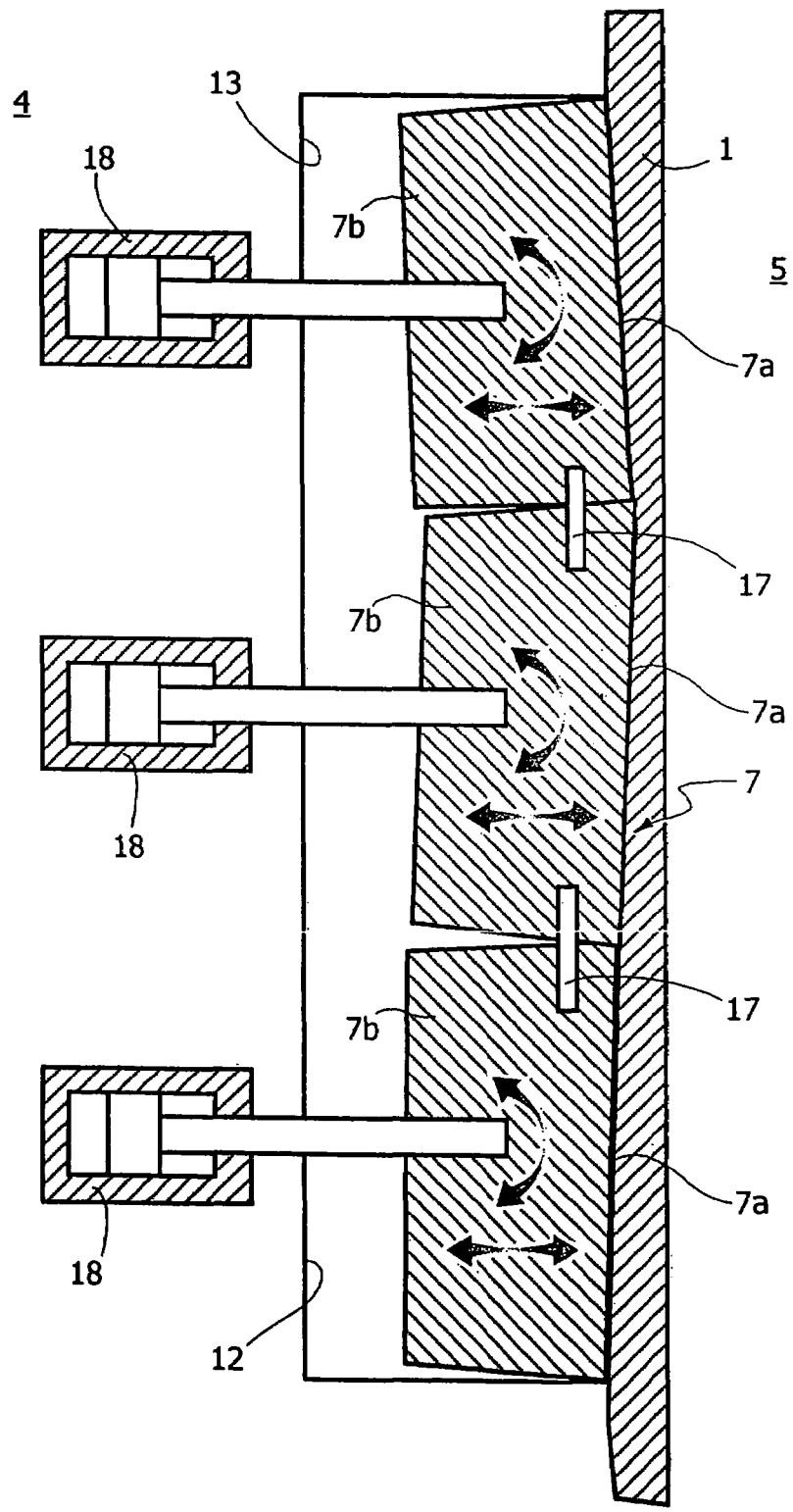
FIG. 5 shows, at an enlarged scale, a detail of a further embodiment of the apparatus.

In the case where the first component 1 presents a curved, instead of plane, conformation, or else where it is formed with a variable thickness, as represented in FIG. 5, the mobile element 7 is advantageously formed by a series of distinct elements or inserts 7b, which are flexible or mobile with respect to one another and in any case floating in such a way that the respective surfaces 7a can adapt to the surface facing them of the first component 1 uniformly and with the minimum force possible. The inserts 7b, which can possibly be connected together via appropriate connection members 17 with an amount of play, are also in this case pushed via respective actuators 18, connected to a control system (not illustrated nor described in detail in so far as it is within the reach of a person skilled in the branch) that carries out synchronization thereof, so as to adapt with precision and flexibility to the surface conformation of the first component 1.

In all of the embodiments previously described, which in any case, represent only some of the possible solutions comprised in the scope of the invention, appropriate sensors will be conveniently provided (for example, associated operatively to the actuators 8, 9 or 18) for verification of the positioning of the corresponding mobile elements 6, 7 or 7b and of the forces applied thereby against the surface of the first component 1 so as to optimize control.

Of course, the details of construction of the apparatus and the modalities of embodiment of the process according to the invention may vary widely with respect to what is described and illustrated herein, without thereby departing from the scope of the invention, as defined in the ensuing claims.

What is claimed is:

1. A process for the production of an article made of moulded plastic material with a first moulded component and at least one second moulded component overmoulded on said first component, said process including: a first step of injection moulding of the first component and a subsequent step of injection moulding of the second component for overmoulding thereof on the first component, in which said first and second injection steps are carried out within a moulding cavity defined between a first mould surface and a second mould surface that are mobile with respect to each other under the action of a closing pressure, wherein in said second injection step for overmoulding said second component, said moulding cavity is at least in part delimited by at least one resting surface of a mobile element which is independent of and mobile with respect to said second mould surface and in contact with said first component; pressing said resting surface solely to the first moulded component by the action of a pressing means coupled to the second mould surface for setting at least one mobile element; wherein an applying force is independent from the closing pressure and applied only along a portion of the first moulded component; avoiding pressing with the force on the second moulded component; and wherein at least one mobile element moves aside of the second moulding cavity when the resting surface applies the force only along the portion of the first moulded component.

2. The process according to claim 1, wherein said resting surface bears upon said first component with a generally uniform force of an amount lower than that of said closing pressure between said mobile mould surface and said stationary mould surface.

3. The process according to claim 1, wherein said force is controlled.

4. The process according to claim 3, wherein said force is adjustable.

5. The process according to claim 1, wherein said force consists of an elastic load.

6. The process according to claim 1, wherein said resting surface is floating.

7. The process according to claim 6, wherein said resting surface is defined by a plurality of contiguous floating mobile elements.

8. The process according to claim 7, wherein said resting surface is set in contact with localized areas of said first component, the remaining areas of said first component being without contact with said resting surface.

9. The process claim 8, wherein areas of gradual transition are provided between said localized areas of contact and said remaining areas of said first component.

10. The process claim 8, wherein areas of steplike transition are provided between said localized areas of contact and said remaining areas of said first component.

11. The process according to claim 1, wherein at least one of said first and second injection steps includes a compression step.

12. The process according to claim 1, wherein at least one of said first and second injection steps includes a step of expansion and subsequent compression.

13. A moulding apparatus for the production of an article made of moulded plastic material with a first moulded component and at least one second moulded component overmoulded on the first component, comprising: a first stationary mould surface and a movable second mould surface, said first mould surface and said second mould surface displaceable against each other under the action of a closing pressure to define a moulding cavity for carrying out a first step of injection of said first moulded component and a subsequent second step of injection of said second moulded component for overmoulding thereof on said first component in a second moulding cavity; at least one mobile element having a resting surface that is coupled to said second mould surface such that said resting surface moves with and is independently moveable relative to said movable second mould surface to delimit, in said second injection step, said second moulding cavity; pressing means coupled to said second mould surface for setting said at least one mobile element and said resting surface in pressing contact solely with said first moulded component, said at least one mobile element and said resting surface applying a force independent from said closing pressure using said pressing means only along a portion of said first moulded component, said at least one mobile element and said resting surface avoiding pressing with the force on said second moulded component; and wherein said at least one mobile element moves aside of said second moulding cavity when said resting surface applies the force only along said portion of for said first moulded component.

14. The apparatus according to claim 13, wherein said pressing means are provided for keeping said resting surface in contact with said first component with a generally uniform force of an amount lower than that of said closing pressure between said second mould surface and said first mould surface.

15. The apparatus according to claim 14, wherein control means are operatively associated to said pressing means.

16. The apparatus according to claim 15, wherein said control means are adjustable.

17. The apparatus according to claim 13, wherein said pressing means are elastic.

18. The apparatus according to claim 13, wherein said pressing means consist of the intrinsic elasticity of said resting surface.

19. The apparatus according to claim 13, wherein said at least one mobile element is defined by at least one floating element.

20. The apparatus according to claim 13, wherein said at least one mobile element is defined by a plurality of contiguous floating mobile elements.

21. The apparatus according to claim 13, wherein said resting surface contacts said first component in localized areas of said first component, remaining areas of said first component avoiding contact with said resting surface.

22. The apparatus according to claim 21, wherein said resting surface has an area of radiusing with gradual transition between said localized areas and said remaining areas of said first component.

23. The apparatus according to claim 21, wherein said localized areas of said first component have a steplike conformation.

24. The apparatus according to claim 13, further including compression means for carrying out a compression step independent from said pressing means and combined with at least one of said first and second injection steps.

25. The apparatus according to claims 13, further including expansion/compression means for carrying out a step of expansion and subsequent compression associated to at least one of said first and second injection steps independent from said pressing means.

26. The apparatus according to claim 13 wherein said second mould surface is movable with respect to said first mould surface.

27. The apparatus according to claim 13 wherein the pressing force comprises a force lower than a force causing the closing pressure.

* * * * *